(12) United States Patent
Collier et al.

(10) Patent No.: US 11,137,314 B2
(45) Date of Patent: Oct. 5, 2021

(54) WATER INTRUSION DETECTION

(71) Applicant: STEERING SOLUTIONS IP HOLDING CORPORATION, Saginaw, MI (US)

(72) Inventors: Bruce M. Collier, Saginaw, MI (US); Shunqing Yang, Grand Blanc, MI (US); Stanley J. Iseler, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 234 days.

(21) Appl. No.: 15/914,509

(22) Filed: Mar. 7, 2018

(65) Prior Publication Data
US 2019/0277721 A1    Sep. 12, 2019

(51) Int. Cl.
*G01M 3/04* (2006.01)
*B62D 5/04* (2006.01)

(52) U.S. Cl.
CPC .......... *G01M 3/045* (2013.01); *B62D 5/0403* (2013.01); *B62D 5/0481* (2013.01); *B62D 5/0424* (2013.01)

(58) Field of Classification Search
CPC ........... G01M 3/045; G01M 3/40; G01M 3/04
USPC .................................................. 73/40, 49.7
See application file for complete search history.

(56) References Cited

U.S. PATENT DOCUMENTS

| | | | | |
|---|---|---|---|---|
| 3,748,625 A * | 7/1973 | Bennewitz | ........... | G01N 27/121 338/34 |
| 4,480,251 A * | 10/1984 | McNaughton | ......... | G01R 31/58 340/604 |
| 4,695,787 A * | 9/1987 | Billet | ..................... | G01V 1/201 324/557 |
| 4,843,305 A * | 6/1989 | Akiba | ................... | G01M 3/165 340/605 |
| 4,864,847 A * | 9/1989 | Anderson | ............... | G01M 3/04 73/40.7 |
| 4,942,364 A * | 7/1990 | Nishijima | ............ | G01N 27/121 324/696 |
| 5,399,445 A | 3/1995 | Tinker | | |
| 6,175,310 B1 * | 1/2001 | Gott | ..................... | G01M 3/165 340/604 |
| 6,639,517 B1 * | 10/2003 | Chapman | ................ | G01M 3/16 137/312 |
| 6,787,718 B2 * | 9/2004 | Andberg | ............... | G01M 3/165 200/61.04 |
| 7,142,425 B2 * | 11/2006 | Tomioka | ................ | G06F 1/203 361/699 |

(Continued)

FOREIGN PATENT DOCUMENTS

DE    102006051799 A1 *   5/2008    ............ G01N 27/10
JP         H0694799 A  *   4/1994

(Continued)

*Primary Examiner* — John Fitzgerald
(74) *Attorney, Agent, or Firm* — Dickinson Wright PLLC

(57) ABSTRACT

A liquid intrusion detection system includes a controller board, an absorbent material, first electrical contacts, and at least one processor. The controller board is disposed within a housing of an electric power steering unit. The absorbent material is at least partially disposed about a component. The first electrical contacts have first ends disposed on at least one of the controller board and the absorbent material. The at least one processor in communication with the first electrical contacts.

6 Claims, 3 Drawing Sheets

(56) References Cited

U.S. PATENT DOCUMENTS

| | | | | |
|---|---|---|---|---|
| 7,146,849 B2* | 12/2006 | Care | | G01M 3/025 |
| | | | | 73/40 |
| 7,984,639 B2* | 7/2011 | Shiozawa | | G06F 1/1632 |
| | | | | 73/40 |
| 9,863,833 B2* | 1/2018 | Lee | | G01M 3/165 |
| 10,191,003 B1* | 1/2019 | Lastinger | | G01N 25/56 |
| 10,457,320 B2* | 10/2019 | Shiino | | B62D 5/0424 |
| 10,464,454 B1* | 11/2019 | Halonen | | G05B 19/042 |
| 10,490,430 B2* | 11/2019 | Hsiao | | G08B 21/182 |
| 10,858,037 B2* | 12/2020 | Murakami | | B62D 5/0481 |
| 2003/0140681 A1* | 7/2003 | Nikolaus | | B60S 1/0822 |
| | | | | 73/29.01 |
| 2007/0169374 A1* | 7/2007 | Hamman | | H05K 7/20772 |
| | | | | 34/DIG. 1 |
| 2009/0007639 A1* | 1/2009 | Shiozawa | | H01M 8/04186 |
| | | | | 73/40 |
| 2009/0187314 A1* | 7/2009 | Kitamura | | B60R 16/0231 |
| | | | | 701/45 |
| 2010/0049403 A1* | 2/2010 | Gillman | | H05K 5/064 |
| | | | | 701/43 |
| 2010/0127460 A1* | 5/2010 | Bennett | | G01M 3/045 |
| | | | | 277/313 |
| 2010/0269941 A1* | 10/2010 | Hara | | G01M 3/047 |
| | | | | 138/97 |
| 2011/0067486 A1* | 3/2011 | Dryden | | 73/40 |
| 2012/0118047 A1* | 5/2012 | Kitchener | | G01N 27/06 |
| | | | | 73/40.5 R |
| 2013/0138299 A1* | 5/2013 | Bhae | | B62D 6/00 |
| | | | | 701/42 |
| 2015/0175192 A1* | 6/2015 | Sin | | B62D 5/0484 |
| | | | | 318/483 |
| 2017/0050669 A1* | 2/2017 | Asakura | | B62D 5/0481 |
| 2017/0341681 A1* | 11/2017 | Shiino | | F16H 25/2418 |
| 2018/0194390 A1* | 7/2018 | Goto | | B62D 5/0481 |
| 2019/0047611 A1* | 2/2019 | Murakami | | B62D 5/0481 |
| 2019/0193780 A1* | 6/2019 | Racz | | B62D 5/0487 |
| 2019/0248408 A1* | 8/2019 | Boda | | G01N 27/048 |

FOREIGN PATENT DOCUMENTS

| | | | |
|---|---|---|---|
| JP | 2006111032 A | * | 4/2006 |
| JP | 201188587 A | * | 5/2011 |
| JP | 6343829 B2 | * | 6/2018 |
| JP | 2018111343 | * | 7/2018 |
| WO | WO 2018110216 A1 | * | 6/2018 |

* cited by examiner

WATER INTRUSION DETECTION

BACKGROUND

Power steering systems may include a steering housing in which a rack is mounted for longitudinal displacement. The longitudinal displacement of the rack leads to pivoting of at least one steerable vehicle wheel. Bellows and seals may be provided with the power steering system to inhibit the intrusion of foreign objects into the steering housing. Intrusion of foreign objects, such as water, into the steering housing may impact the performance of the power steering system. Accordingly, it is desirable to provide a detection system to indicate the intrusion of foreign objects into the steering housing to mitigate potential impact to the performance of the power steering system.

SUMMARY

In at least one embodiment, a power steering system is provided. The power steering system includes a power steering unit and a liquid intrusion detection system. The power steering unit has a housing provided with at least one sealing member and a component disposed within the housing. The liquid intrusion detection system includes an absorbent material, first electrical contacts, and at least one processor in communication with the first electrical contacts. The absorbent material is disposed within the housing and at least partially disposed about the component. The first electrical contacts are in contact with the absorbent material and have first ends.

In at least one embodiment, a power steering system is provided. The power steering system includes a power steering unit and a liquid intrusion detection system. The power steering unit has a first housing, a second housing, and a power assist housing assembly joined to each other and a component disposed within at least one of the first housing, the second housing, and the power assist housing assembly. The liquid intrusion detection system includes an absorbent material, first electrical contacts, and at least one processor in communication with the first electrical contacts. The absorbent material is disposed within at least one of the first housing, the second housing, and the power assist housing assembly proximate the component. First electrical contacts in contact with the absorbent material. The at least one processor is in communication with the first electrical contacts.

In at least one embodiment, a liquid intrusion detection system provided with an electric power steering system. The liquid intrusion detection system includes a controller board, an absorbent material, first electrical contacts, and at least one processor. The controller board is disposed within a housing of an electric power steering unit. The absorbent material is at least partially disposed about a component. The first electrical contacts have first ends disposed on at least one of the controller board and the absorbent material. The at least one processor in communication with the first electrical contacts.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
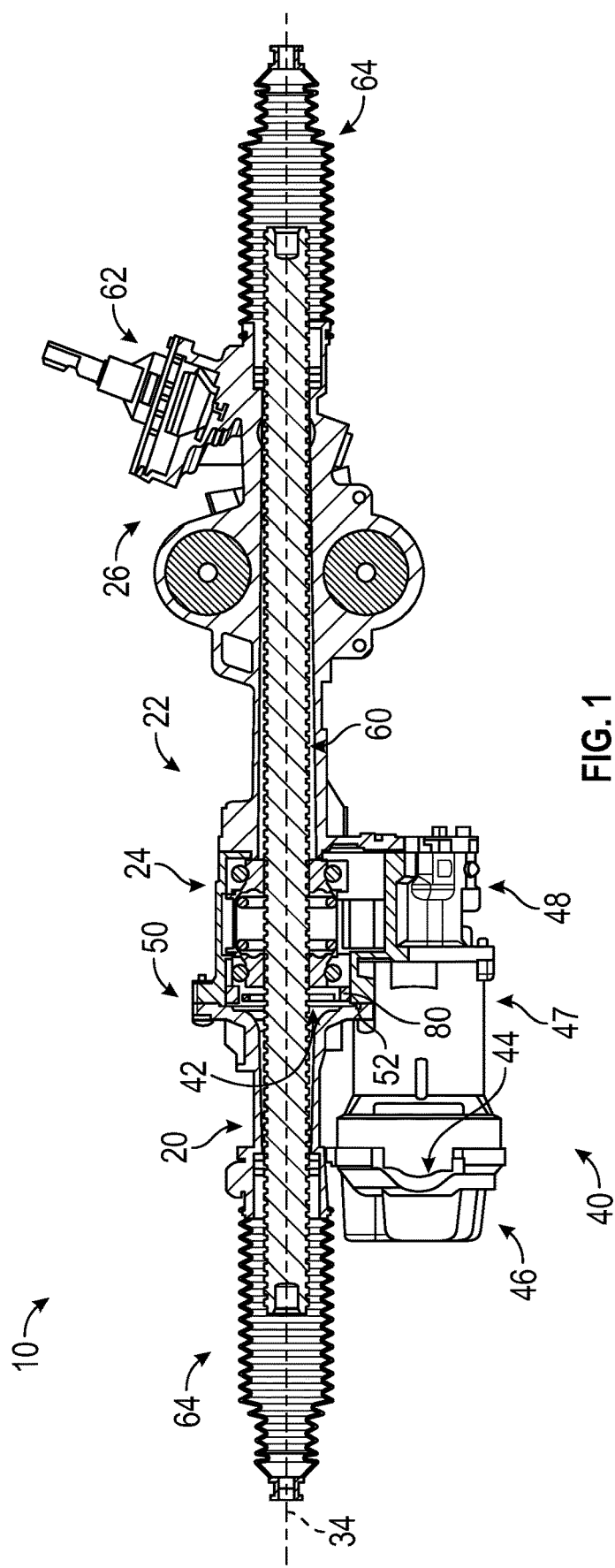
FIG. 1 is a cross-sectional view of a power steering unit.

Vehicles may be provided with a power steering system that is arranged to articulate or pivot at least one vehicle wheel responsive to rotation of a steering wheel. The power steering system may be an electric power steering system that includes a power steering unit 10. Referring to FIG. 1, a cross-sectional view of a power steering unit 10 is shown. The power steering unit 10 may be an electric power steering unit that includes a first housing 20, a second housing 22, a power assist mechanism 24, a steering mechanism 26, and a liquid intrusion detection system 28.

The first housing 20 and the second housing 22 are disposed about a lateral axis 34.

Figure 2:
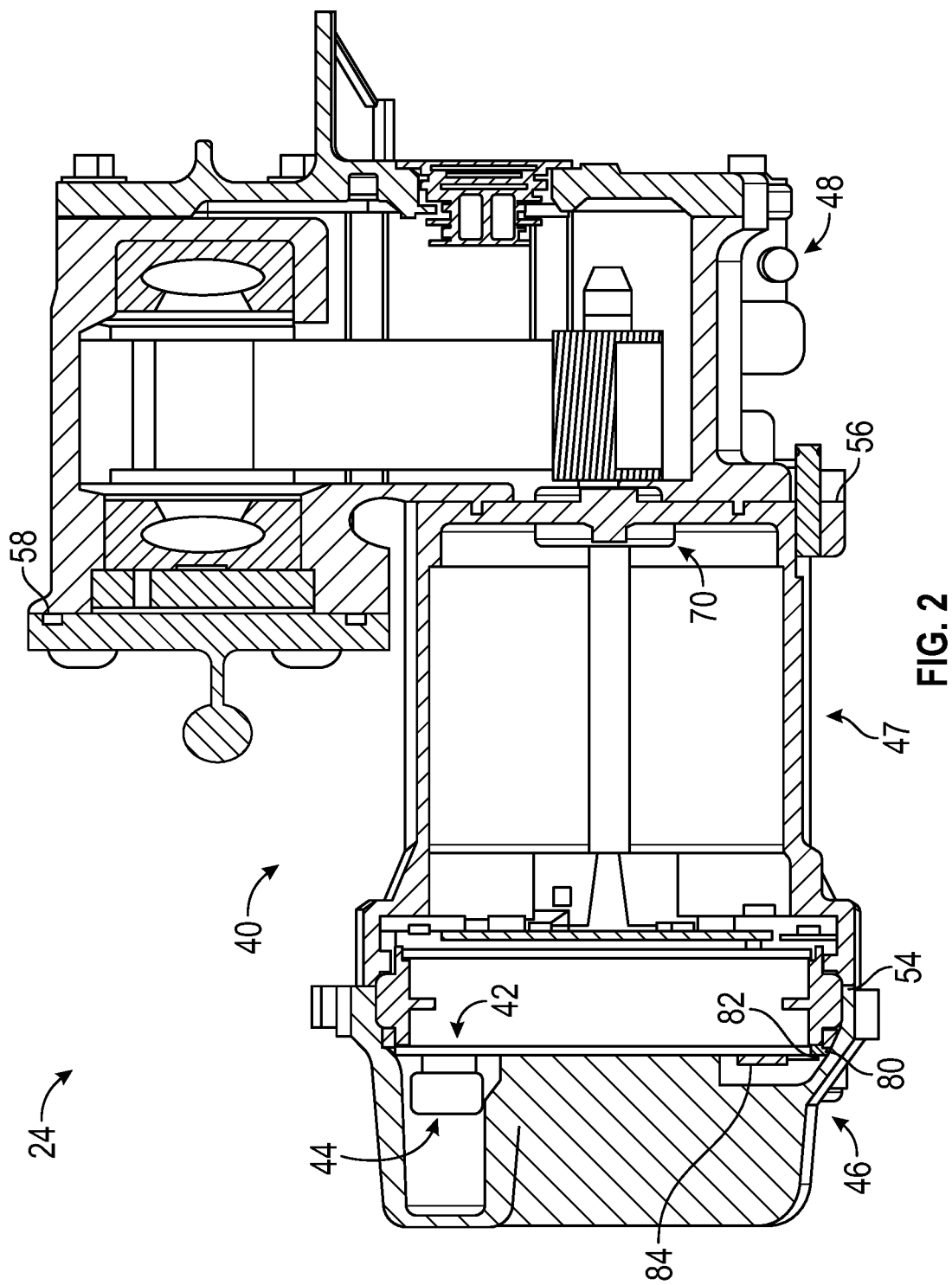
FIG. 2 is a cross-sectional view of a portion of the power steering unit.

The power assist mechanism 24 is operatively connected to at least one of the first housing 20 and the second housing 22. The power assist mechanism 24 includes a power assist housing assembly 40 and a component 42 that may be disposed within the power assist housing assembly 40, as shown in FIG. 2. In at least one embodiment, the component 42 may be disposed within at least one of the first housing 20 and/or the second housing 22, as shown in FIG. 1. The component 42 may be a controller board, an actuator, or a generally stationary component.

Referring to FIGS. 1 and 2, the power assist housing assembly 40 may be disposed between and operatively connected to the first housing 20 and the second housing 22. In at least one embodiment, the power assist housing assembly 40 may be provided with the second housing 22 and the combination of the power assist housing assembly 40 and the second housing 22 may be joined to the first housing 20 at a junction 50 that is provided with a sealing member 52.

As shown in FIGS. 1 and 2, the power assist housing assembly 40 may include a cover 46, a motor housing 47, and a mechanical housing 48. The cover 46 may be connected to the motor housing 47. The motor housing 47 receives an actuator or a motor and may be connected to the mechanical housing 48. The mechanical housing 48 may be connected to at least one of the first housing 20 and the second housing 22. A first interface 54 may be defined between the cover 46 and the motor housing 47. A second interface 56 may be defined between the motor housing 47 and the mechanical housing 48. A third interface 58 may be defined between the mechanical housing 48 and at least one of the first housing 20 and the second housing 22.

At least one connector 44 may extend from or extend at least partially through the cover 46 that is operatively connected to the power assist housing assembly 40 to provide electrical and signal communication to the component 42.

The steering mechanism 26 includes a translatable member 60 and in some embodiments, a pinion assembly 62. The translatable member 60 may extend through the first housing 20, the second housing 22, at least a portion of the power assist housing assembly 40 along the lateral axis 34. The translatable member 60 may include a toothed rack that is drivably connected to the power assist mechanism 24 and in some embodiments, the pinion assembly 62.

The pinion assembly 62 may be connected to the second housing 22 and includes a pinion shaft that is arranged to engage the translatable member 60. The translatable member 60 may translate along the lateral axis 34 responsive to rotation of the pinion shaft and/or operation of the power assist mechanism 24 to move or pivot a tie rod or other steering member that may extend from an end of the translatable member 60.

Flexible boots 64 may be disposed at ends of the translatable member 60. A first flexible boot is disposed about an end of the translatable member 60 that may be disposed proximate an end of the first housing 20. The first flexible boot may engage the first housing 20 to protect internal components of the power steering unit 10 from an external environment. A second flexible boot is disposed about an end of the translatable member 60 that may be disposed proximate an end of the second housing 22. The second flexible boot may engage the second housing 22 to protect internal components of the power steering unit 10 from the external environment.

The intrusion of a foreign object, such as a liquid 66, from the external environment may affect the performance of electrical or mechanical components of the power steering unit 10. Entry of the liquid into the power steering unit 10 may potentially occur proximate an interface between the flexible boots 64 and at least one of the first housing 20 and the second housing 22, may potentially occur proximate the junction 50, may potentially occur proximate the interface between the pinion assembly 62 and the second housing 22, may potentially occur proximate an interface having a sealing member between the cover 46 and the power assist housing assembly 40, may potentially occur proximate or at the connector 44, may potentially occur proximate the first interface 54, may potentially occur proximate the second interface 56, may potentially occur proximate the third interface 58, or may potentially occur proximate an area of a component due to a material defect such as porosity. The liquid intrusion detection system 28 is arranged to detect a presence of a foreign object such as a liquid within at least one of the first housing 20, the second housing 22, and/or the power assist housing assembly 40 of the power steering unit 10.

The liquid intrusion detection system 28 is arranged to detect the presence of a small quantity of a liquid, such as water, within the power steering unit 10 and output a signal indicative of the presence of the liquid. The signal may be a diagnostic trouble code that is output for display as a warning to an operator of a vehicle that incorporates the power steering unit 10 as to the presence of the liquid to avoid affecting performance of the power steering unit 10.

Figure 3:
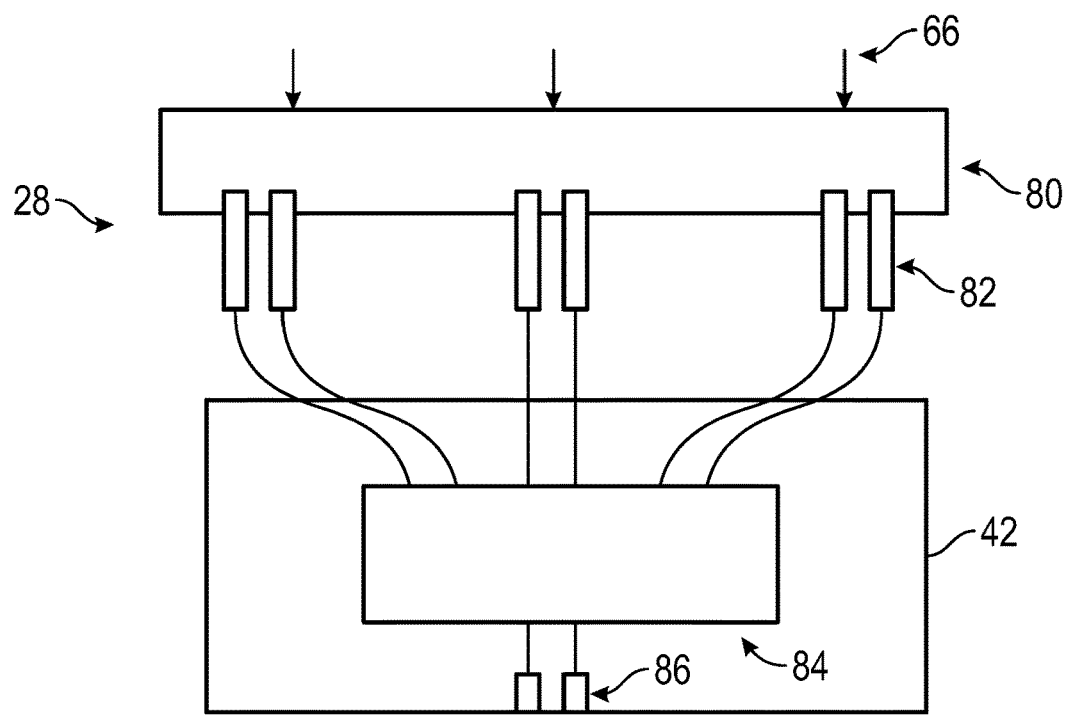
FIG. 3 is a system schematic of a liquid intrusion detection system.

Referring to FIG. 3, the liquid intrusion detection system 28 includes an absorbent material 80, first electrical contacts 82, at least one processor 84, and in at least one embodiment, second electrical contacts 86.

The absorbent material 80 may be an absorbent wicking material that is essentially nonconductive when dry and is essentially electrically conductive when wet. The absorbent material 80 is arranged to absorb a liquid 66 and retain/contain the liquid 66 to prevent splashing of the liquid within the power steering unit 10.

The absorbent material 80 may be disposed within the power steering unit 10 proximate a potential liquid entry point. For example: a) the absorbent material 80 may be disposed within at least one of the first housing 20, the second housing 22, the power assist housing assembly 40, and/or within the cover 46; b) the absorbent material 80 may be disposed proximate the junction 50 between the first housing 20 and the second housing 22 and/or the power assist housing assembly 40; c) the absorbent material 80 may be disposed proximate the first interface 54 between the cover 46 and motor housing 47, as shown in FIG. 2; d) the absorbent material 80 may be disposed proximate the second interface 56 between the motor housing 47 and the mechanical housing 48; e) the absorbent material may be disposed proximate the third interface 58 between the mechanical housing 48 and at least one of the first housing 20 and the second housing 22; f) the absorbent material 80 may be disposed proximate the interface between the first flexible boot and the first housing 20 and/or proximate the interface between the second flexible boot and the second housing 22; and/or g) a location within the power steering unit 10 that a liquid may settle such as a low point within the first housing 20, the second housing 22, or the power assist housing assembly 40.

Figure 4:
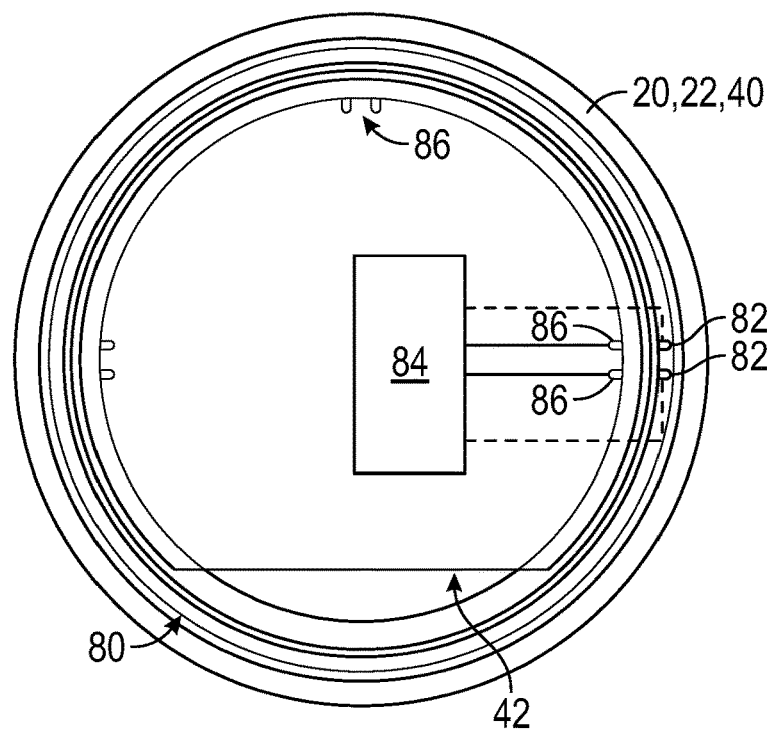
FIG. 4 is an end view of the liquid intrusion detection system provided with the power steering unit.

More specifically, the absorbent material 80 may be disposed proximate the junction 50 and the component 42, as shown in FIG. 1. The absorbent material 80 may be disposed between at least one sealing member and the component 42, as shown in FIG. 2. The absorbent material 80 may be at least partially disposed about the component 42, as shown in FIGS. 2 and 4.

The first electrical contacts 82 may be at least partially embedded within the absorbent material 80, may at least partially extend from the absorbent material 80, as shown in FIG. 3, may be disposed on or in contact with the absorbent material 80. First ends of the first electrical contacts 82 are at least partially embedded or at least partially extend from the absorbent material 80. The first ends of the first electrical contacts 82 are spaced apart from each other but are disposed proximate each other such that they form open contacts.

The first ends of the first electrical contacts 82 may be made of a conductive form or material, may be exposed wires, or exposed traces. The absorbent material 80 is arranged to wick or direct a liquid towards the first ends of the first electrical contacts 82 to close the open circuit.

In at least one embodiment, the first electrical contacts 82 may be disposed on or may at least partially extend from the component 42.

The at least one processor 84 may be disposed on the component 42. In at least one embodiment, the at least one processor 84 is spaced apart from the component 42 and may be disposed on at least one of the first housing 20, the second housing 22, or the power assist housing assembly 40. The at least one processor 84 may be provided as part of an independent controller, may be provided as part of a controller that is provided with the power steering unit 10, may be provided with an overall vehicle controller, or may be provided as part of a vehicle monitoring system.

The at least one processor 84 is in communication with the first electrical contacts 82. The at least one processor 84 may be in wired, wireless communication, or otherwise in communication with the first electrical contacts 82. For example, the first electrical contacts 82 may be provided with a transmitter that is arranged to provide a signal indicative of the presence of liquid to a receiver that is provided with the at least one processor 84.

Responsive to the liquid being disposed proximate or directed towards the first ends of the first electrical contacts 82 and closing the open circuit, the at least one processor 84 is programmed to output a signal indicative of the presence of the liquid. The at least one processor 84 may determine whether the circuit is closed or open by voltage differential, current flow, resistance, or other methods.

The second electrical contacts 86 may be at least partially embedded within the absorbent material 80, may at least partially extend from the absorbent material 80, may be in contact with the absorbent material 80, or may be disposed on the component 42. The second electrical contacts 86 may be spaced apart from the first electrical contacts 82. The first ends of the first electrical contacts 82 are aligned with and are offset from the second ends of the second electrical contacts 86.

The second ends of the second electrical contacts 86 are spaced apart from each other but are disposed proximate each other such that they form open contacts. The second ends of the second electrical contacts 86 may be made of a conductive form or material, may be exposed wires, or exposed traces.

The second ends of the second electrical contacts 86 may be disposed on the component 42, as shown in FIG. 4.

The at least one processor 84 may also be in communication with the second electrical contacts 86. In at least one embodiment, the at least one processor 84 may be in wireless communication with the second electrical contacts 86. In such an embodiment, the second electrical contacts 86 may be provided with a transmitter that is arranged to provide a signal indicative of the presence of liquid to a receiver that is provided with the at least one processor 84.

Responsive to the liquid being disposed proximate or directed towards the second ends of the second electrical contacts 86 and closing the open circuit, the at least one processor 84 is programmed to output a signal indicative of the presence of the liquid.

The liquid intrusion detection system 28 notifies an operator of the vehicle of liquid intrusion into the power steering unit 10 responsive to the at least one processor 84 detecting the presence of a liquid within the absorbent material 80 proximate ends of the electrical contacts or the presence of a liquid on the component 42 proximate ends of the electrical contacts.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. A liquid intrusion detection system provided with an electric power steering system, comprising:
   a component disposed within a housing of an electric power steering unit;
   an annular absorbent material disposed annularly about the component;
   first electrical contacts having first ends attached to the annular absorbent material; and
   at least one processor in communication with the first electrical contacts,
   wherein the component is a controller board and the at least one processor is disposed on the controller board, said annular absorbent material extending annularly about said controller board and said at least one processor.

2. The liquid intrusion detection system of claim 1, wherein the at least one processor is programmed to, responsive to at least one of a liquid within the annular absorbent material and a liquid present on the controller board, output a signal indicative of a presence of the liquid.

3. The liquid intrusion detection system of claim 2, wherein the annular absorbent material is arranged to direct a liquid towards the first electrical contacts.

4. A liquid intrusion detection system provided with an electric power steering system, comprising:
   a housing assembly having a first housing fixed to a second housing and a mechanical housing fixed to a motor housing, the first housing and the second housing extending along a first axis, the mechanical housing extending laterally away from the first axis, and the motor housing extending laterally away from the mechanical housing;
   a translatable member extending along the first axis through the first housing and the second housing;
   a controller board disposed within the motor housing;
   at least one processor disposed on the controller board;
   an annular absorbent material extending annularly about the controller board and the at least one processor;
   first electrical contacts having first ends attached to the annular absorbent material; and
   the at least one processor being configured in communication with the first electrical contacts.

5. The liquid intrusion detection system of claim 4, wherein the at least one processor is programmed to, responsive to at least one of a liquid within the annular absorbent material and a liquid present on the controller board, output a signal indicative of a presence of the liquid.

6. The liquid intrusion detection system of claim 4, wherein the annular absorbent material is arranged to direct a liquid towards the first electrical contacts.

\* \* \* \* \*